United States Patent
Collins

Patent Number: 5,819,420
Date of Patent: Oct. 13, 1998

[54] COPING FOOT FOR A JIG SAW AND METHOD OF USE

[76] Inventor: David A. Collins, 10179 Brock Rd., Plain City, Ohio 43064

[21] Appl. No.: 841,939

[22] Filed: Apr. 8, 1997

[51] Int. Cl.[6] .................................................. B27B 11/02
[52] U.S. Cl. ............................................. 30/374; 30/289
[58] Field of Search ............................ 30/273, 286, 289, 30/296.1, 373, 374, 376, 392, 393, 394, 509

[56] References Cited

U.S. PATENT DOCUMENTS

| | | | |
|---|---|---|---|
| 2,122,611 | 7/1938 | Kirby | 30/376 |
| 2,722,244 | 11/1955 | Schultz | 30/394 |
| 3,087,519 | 4/1963 | McCarty et al. | 30/376 |
| 3,339,598 | 9/1967 | Frostad | 30/376 |
| 3,456,698 | 7/1969 | Csaki | 30/273 |
| 3,461,732 | 8/1969 | Gregory | 30/393 |
| 3,707,768 | 1/1973 | Spengler | 30/374 |
| 3,938,251 | 2/1976 | Karemann | 30/376 |
| 4,023,273 | 5/1977 | Treleaven | 30/373 |
| 4,334,356 | 6/1982 | Krosunger | 30/374 |
| 4,743,004 | 5/1988 | Kloss | 269/296 |
| 5,012,583 | 5/1991 | Blochle et al. | 30/374 |
| 5,421,091 | 6/1995 | Gerritsen, Jr. | 30/392 |

Primary Examiner—Hwei-Siu Payer
Attorney, Agent, or Firm—James R. Eley, Esq.

[57] ABSTRACT

A jig saw accessory is provided that is adaptable to multiple brands of jig saws and mounts to a saw in place of its conventional flat base. The invention is an improved coping foot plate for a reciprocating saw comprising a round or bullet nosed foot plate having a superior, top surface and an inferior, bottom surface opposite the top surface; an proximal end and a distal end opposite the proximal end; two lateral portions, left and right, opposite each other, each lateral portion being the mirror image of the other as the foot plate is bisected medially from proximal end to distal end; and a means for providing a rounded bearing surface plate for a jig saw with blade whereby triple compound cuts can be made into a material in one motion or movement while maintaining plate bearing contact at the point of blade to material cut or penetration. The invention's rounded shape bears upon the stock material being cut while covering and protecting the reciprocating pivot wheel of the saw and allowing counter support to the upstroke force of the blade. The bearing surface is sloped or formed in such a manner as to allow bearing contact of the plate in the vicinity of blade to material penetration in any of 360° while producing triple compound angle cuts in the material. It is especially effective for coping crown moldings, particularly the cope described by a 135° intersection of the molding pieces. It is useful, however, for any application where it is necessary to alter blade bevel, pitch, and direction or line of the cut while cutting.

17 Claims, 2 Drawing Sheets

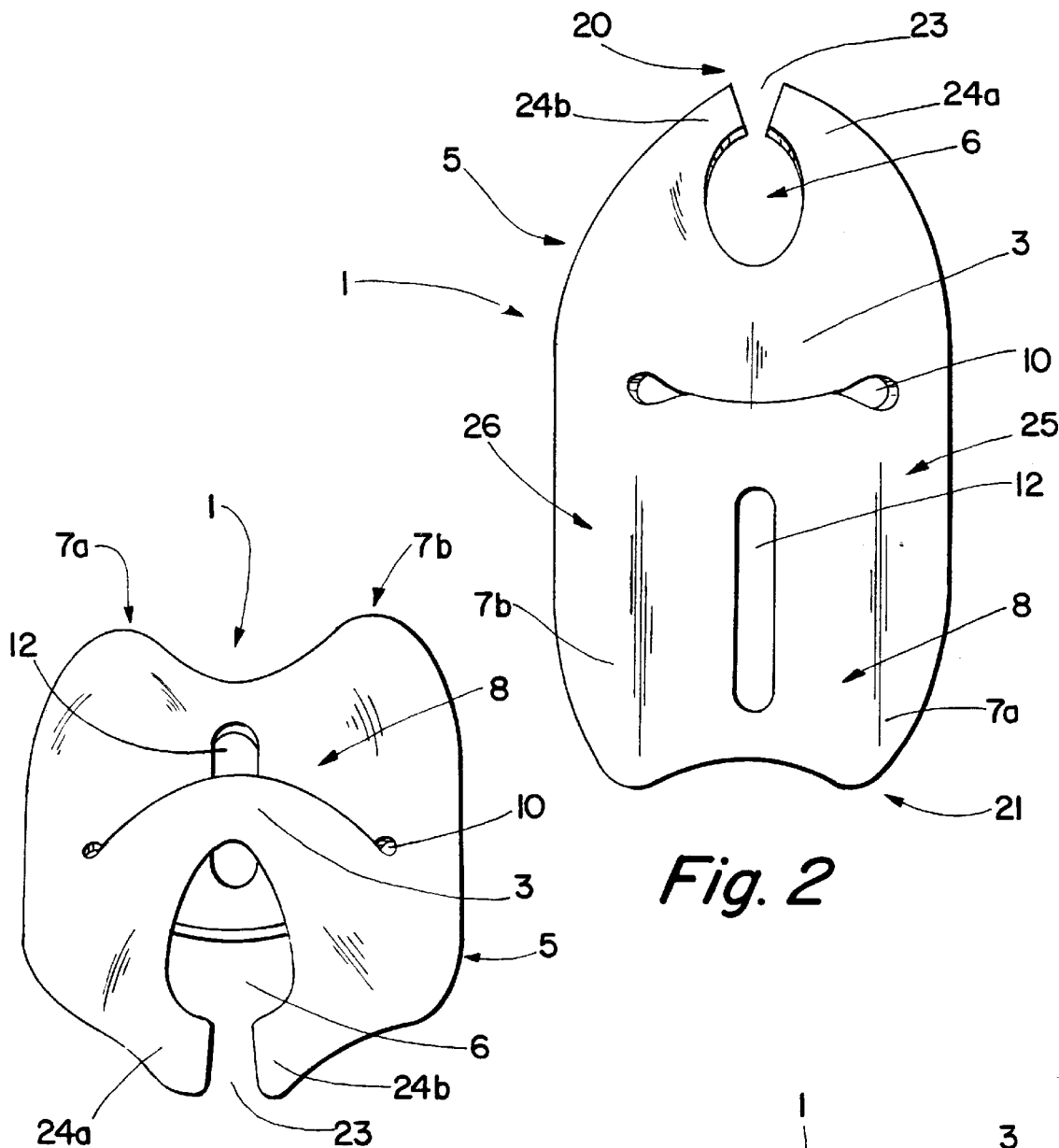
Fig. 1
Fig. 2
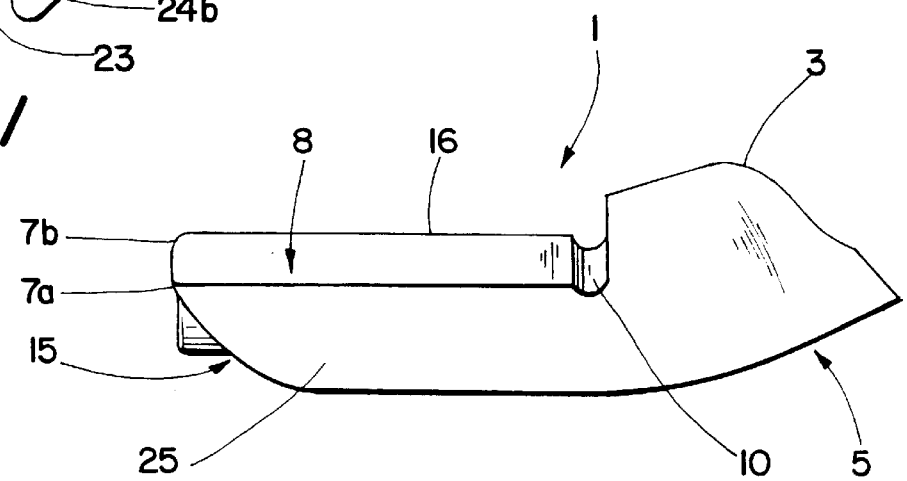
Fig. 3

COPING FOOT FOR A JIG SAW AND METHOD OF USE

BACKGROUND OF THE INVENTION

This invention relates to a base or foot plate for a jig saw which aids in the cutting or coping of compound angles in materials such as wood.

A jig saw is a type of saw having a narrow linear blade set into a plunging shaft, typically used to cut, with a vertical motion, along wavy or irregular lines of cut and may be used by carpenters or other craftsmen to cut and shape, i.e., cope, decorative molding, among other things. The line of cut is known as the saw's cut-angle or cut-curve and is defined as the direction or line of the cut followed by the saw blade and defined by the kerf, i.e., the slot created by the blade. Reciprocating jig saws have a mechanism that thrusts the blade forward on each cutting stroke. This action creates a very aggressive cutting action which lessens the effort needed to be asserted by the operator.

In addition to cut-angle, i.e., the line across the face of the material, the operator can also bevel the cut by physically adjusting the base of the saw to the desired angle. The operator can also pitch the kerf somewhat by tilting the saw forward or backward onto the front or rear edge of the base during cutting. Pitch is the operation wherein the saw operator inclines the saw blade teeth downward and forward or backward and upward, and bevel is defined as an angle cut through the material at other than a 90° angle. The process of cutting materials while simultaneously varying the cut-angle, bevel and pitch of the saw blade is known as a triple compound angle cut. Such triple compound cutting, wherein the operator can pitch the blade while beveling and changing the cut-angle, is an important factor in the coping of molding pieces to assure a secure and tight fit of the pieces being joined, but heretofore has not been achievable using a jig saw.

Crown molding is typically used along the junction of walls and ceilings to provide decorative features to a room as well as cover corner junction areas. This variety of molding has three flat rear surfaces, one of which is typically mounted against a ceiling, one of which is mounted against the wall, and the third of which is disposed at a 45-degree angle to the other two. When two pieces of crown molding are to be fitted at a corner wall junction, a mitered joint is typically not preferred because of the difficulty of adjusting the joint so that the intersecting profiles line up exactly, fit tightly together and stay in position. Craftsmen will typically extend one of the crown molding pieces flush to the abutting wall and hand cut, with the use of a coping saw, the intersecting crown molding piece to fit the facing profile of the first piece. The second, formed piece must be provided with a carefully crafted end to match the face profile of the first piece to prevent a gap appearing between the fitted pieces.

Previously, the hand-fitted end of the intersecting crown molding piece has typically been formed by first providing a cut of 45-degree angle across the face of the crown molding with a miter saw, and then coping out the waste by use of a coping saw. A coping saw is a hand tool with a fine linear blade stretched tightly in a U-shaped frame, typically used for cutting curved outlines with any combination of bevels, angles, and pitches. Analysis of a properly cut crown molding joint reveals cut-angle, bevel, and pitch, or triple compound cut. This process requires considerable time and effort to achieve the proper cut.

In cutting crown molding it is useful for the freehand jig saw operator to be able to cope along the cut-angle while at the same time varying the bevel and pitch of the cut, making a triple compound angle cut in one motion. It is also important to the operator to be able to shift or change, at will, the direction of the cut, or cut-angle, while continuing to utilize a bevel and pitch cut on the work material. The portion of the saw through which the blade reciprocates and which contacts the material during cutting is known as the jig saw base or foot. Standard jig saw bases are flat and do not permit triple compound angle cuts to be readily made by the operator. During attempts to create triple compound cuts with jig saw having a conventional base, the foot contacts the wood and the saw blade is forced to be withdrawn out of the material during a change in cut-angle. This negates the pitch cut necessary to effective cutting and forming of crown molding.

In the process of coping crown molding or making freehand cuts, such as employed during sawing helical, conical or spiral shapes with varying bevels and curves during the course of the same cut-angle as measured through the material on a right angle to or radius line of the cut, it is necessary to both bevel the cut as measured perpendicular to the saw and/or flat side of the blade, and at the same time pitch the blade forward or backward as measured parallel to the line of cut. Conventional jig saw bases typically only allow the blade to be beveled, or angled right or left as measured parallel to the cut The flat type of jig saw bases cited in U.S. Pat. No. 3,938,251 by James Kareman, U.S. Pat. No. 3,456,698 by Joachim Csaki, U.S. Pat. No. 4,334,356 by Peter Krosunger, and U.S. Pat. No. 3,339,598 by Lars Frostad are still utilized in the majority of jig saws, but are limited in their use in coping by offering only double compound cuts, such as cut-angle and bevel, and do not offer a means for effecting triple compound cuts when cutting or coping materials. Further, the prior art, such as the Kareman invention, is limited for use in combination with a limited number or type of saws. The invention disclosed in U.S. Pat. No. 2,122,611 by Alfert F. Kirby, does not contain a base, but is instead a device for converting a power hand drill into a power saber-saw. The disclosures in U.S. Pat. No. 4,023,273 by Thomas Treleaven and U.S. Pat. No. 4,743,004 by Gary Kloss are not jig saw bases, but rather, are cutting guides attachable to the material being cut. The disclosure in U.S. Pat. No. 3,707,768 by Ernst M. Spengler, is a jig saw base device for cutting curved surfaces, such as barrels, and is not adaptable to cope complex moldings.

One problem with attempting to cope molding with a jig saw having a conventional, flat base, stems from the fact that as the craftsman maneuvers the saw to effect a triple compound cut, the pivot point of the base, i.e., its bearing point shifts away from the centerline of the blade action. Thus, when attempting to pitch the blade forward or backward using a jig saw with a flat base such as is described in the above cited patents, the size and shape of the base causes the blade to be withdrawn from the kerf as the saw pivots on or at the front or rear of the base. Additionally, if one were to attempt to use an extra-long blade that penetrated entirely through the material being cut while allowing for the saw pivots on or at the front or rear of the base. Additionally, if one were to attempt to use an extra-long blade that penetrated entirely through the material being cut while allowing for pivoting the blade forward or backward, the resistance to the force of the upstroke of the blade would be removed from the center of penetration during operation, such that the reciprocating action of the blade causes severe jig saw vibration. Such vibration action can typically only be controlled by grasping the saw tightly, supplying physical counter resistance while prying or applying significant force against the point of base-to-material contact. In addition, when beveling a cut while the jig saw is supported by a conventional jig saw base, the cut-angle or curve of cut is limited by the conventional base design to 45°. In the case of a 135° intersection of crown molding, described above as the intersection of a second piece of molding to fit the face of a first piece of molding (commonly referred to as a 45° angle or intersection), it is necessary to cope, shape or cut the backside or back edges of the intersecting piece more than 45° in order to insure that the joint of the two intersecting pieces of molding will close or fit together entirely. When attempting to increase a 45° angle of cut with a conventional base, it is necessary to pivot the saw onto the edge of the saw base and again retract the blade from the kerf, shifting the point of resistance away from the center of the cut and creating vibration as the blade on the upstroke pulls the saw toward the stock.

For the foregoing reasons there is a need for a device that can be used in connection with a jig saw to readily facilitate high quality coping of complex moldings with reduced physical effort.

SUMMARY OF THE INVENTION

The present invention is directed to a device that satisfies this need. The present invention permits a jig saw operator to make freehand triple compound angle cuts in molding or other materials in one motion, with one saw, without the need to continually adjust the mounting angle of the jig saw base.

An object of one embodiment of the present invention is to eliminate the necessity of loosening a set screw or other clamping device used to fix a jig saw base to a jig saw in order to rotate or pivot a jig saw base (thereby permitting the changing of the angle of the jig saw blade relative to said base plate), prescribing or setting an adjusted angle of bevel or pitch and then re-tightening the set screw, as must be performed with conventional bases in order to change cut-angles, bevel and pitch during cutting of molding or other materials.

Another object of one embodiment of the present invention is to enable more than the standard 45° of blade angle relative to the jig saw base, thereby avoiding the current necessity of pivoting the saw onto a side edge of the saw base plate, which action causes the saw blade to retract or pull out from the kerf.

Another object of one embodiment of the present invention is to allow the blade to pitch forward during use so that the shank end teeth (nearest the point of attachment of the blade to the saw body) of the saw blade advance through the cut area described by the angle or curve of the cut ahead of the tip end teeth (the point area or blade portion farthest from the attachment point of blade and saw) at an angle such as 45° or more while the base plate is maneuvered to maintain counter-supporting, contact with the material surface close to the center of blade penetration through or into the material.

Yet another object of one embodiment of the present invention is to allow the blade to pitch backward during use so that the tip end teeth of the blade advance through the cut ahead of the shank end teeth to the greatest degree allowed or permitted by the physical limitations imposed by the design of whatever configuration of saw body the invention is attached to, while the base plate maintains counter-supporting contact with the material surface close to the center of blade penetration through or into the material.

Still another object of one embodiment of the present invention is to allow the saw body to be pitched forward or backward during use while angling or beveling the blade right or left, or side to side, all the while maintaining bearing contact close to the center of saw blade penetration.

Still another object of one embodiment of the invention is to provide a foot plate wherein the bearing surface is sloped or formed in such a manner as to enable the saw blade, during use, to be beveled, pitched forward or backward and relatively unrestricted in movement except by the physical restrictions imposed by the body of the saw itself.

Still another object of one embodiment of the invention is to provide a foot plate wherein the bearing surface is sloped or formed in such a manner as to allow the saw blade to be pitched forward more than 45° while maintaining bearing contact in proximity to the vertical center of the jig saw blade.

Still another object of one embodiment of the invention is to provide a jig saw base wherein the bearing surface is sloped or formed in such a manner as to allow the saw blade to be pitched backward until restricted only by the body of the saw itself while maintaining bearing contact in the proximity to the vertical center of the jig saw blade.

Still another object of one embodiment of the invention is to provide a jig saw base wherein the bearing surface is sloped or formed in such a manner as to enable bearing contact in proximity to the vertical center of the jig saw blade in any of 360° degrees while producing triple compound angle cuts in material being cut.

These and other advantages will be readily apparent to those skilled in the art based upon the disclosure contained herein.

A BRIEF DESCRIPTION OF THE DRAWINGS

FIG. 1 is a front perspective view of the coping foot according to one embodiment of the invention.

FIG. 2 is a plan view of the coping foot according to one embodiment of the invention.

FIG. 3 is a side perspective view of the coping foot according to one embodiment of the invention.

DETAILED DESCRIPTION OF THE PREFERRED EMBODIMENTS

Figure 4:
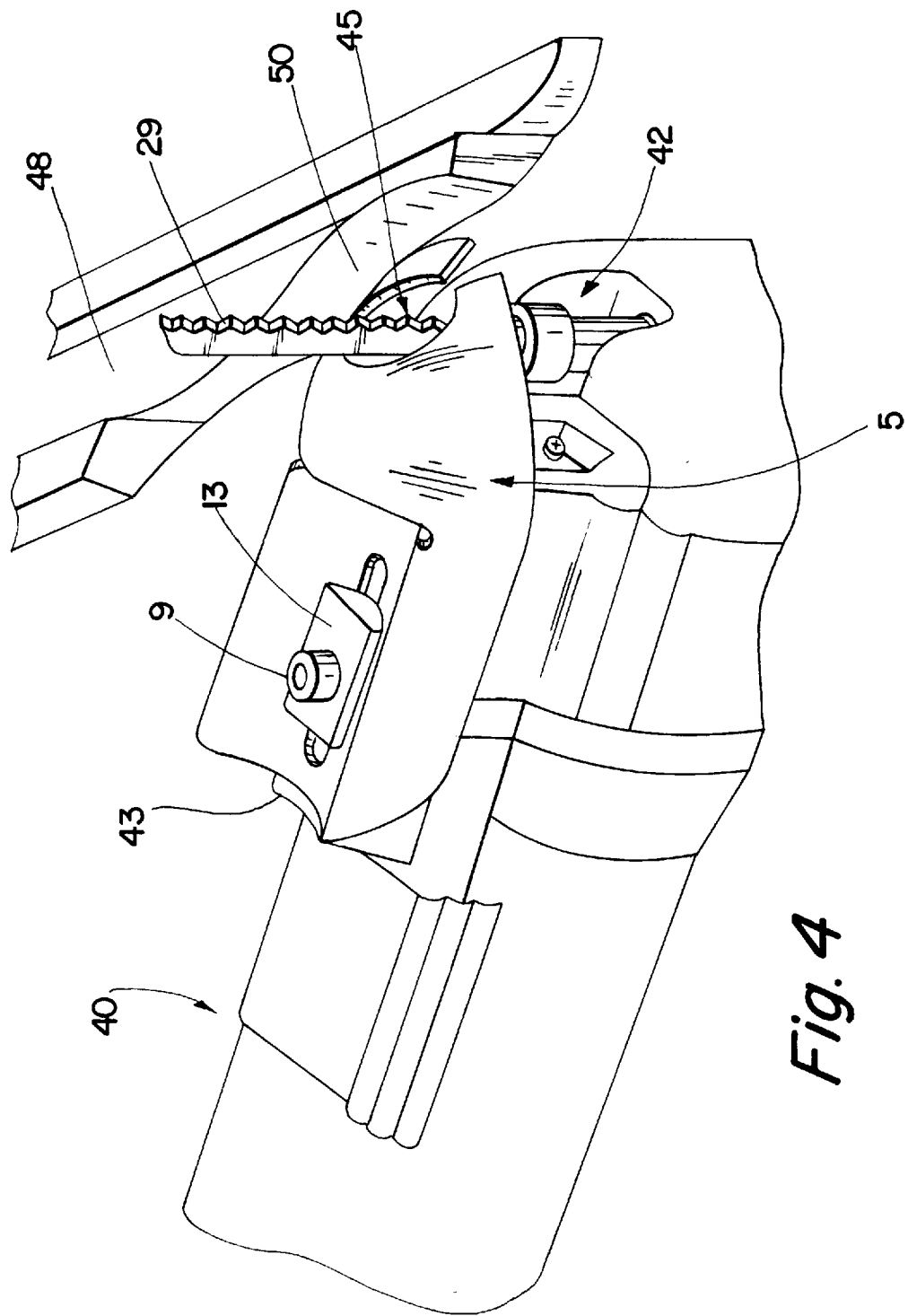
FIG. 4 is an upper side perspective view of a coping foot mounted to a jig saw and in cutting contact with a section of molding at an angle according to one embodiment of the invention.

Certain terminology may be employed in the description to follow for convenience rather than for any limiting purpose. For example, the terms "forward," "rearward," "right," "left," "upper," and "lower" designate directions in the drawings to which reference is made, respectively, to directions toward and away from the center of a referenced element. Terminology of similar import other than the words specifically mentioned above likewise is to be considered as being used for purposes of convenience rather than in any limiting sense. For the purposes of the discourse to follow, the precepts of the coping foot of the invention herein involved are described in connection with its utilization in connection with the coping of complexly shaped wood molding or other similar materials. It will be appreciated, however, that aspects of the present invention will find utility in connection with the cutting and shaping of other such materials which demand complex angular cuts. The following description therefor should be construed as illustrative rather than limiting.

Referring collectively to FIGS. 1–4, one embodiment of the invention discloses a coping foot 1 for a reciprocating saw having a top surface 15 facing the body 43 of saw 40 and a bottom surface 16 opposite the top surface which confronts the material 48 during use of the coping foot, a proximal end 20 in relation to saw blade port 6 and a distal end 21 opposite said proximal end, two lateral portions, being left flange 25 and right flange 26, opposite one another, each flange being the mirror image of the other as the foot plate is bisected medially from said proximal to said distal ends.

The coping foot 1 is provided with a protruding, domed bearing surface 5 formed into the lower 16, proximal end 20 of the coping foot 1 and domed inferiorally, said bearing surface 5 having a saw blade port 6 formed into it extending medially from an area anterior to the centrally located apex 3 of the domed surface 5 and may extend outwardly from saw blade port 6 to create a notched opening 23 through a confronting edge of domed surface 5 through which a saw blade 29 may protrude. If notched opening 23 is provided, it creates right and left tangs 24a and 24b which provide forward bearing surfaces as the jig saw may be tilted forward. Notched opening 23 also provides a visual guide for the operator in maintaining alignment with marks which may be scribed onto the work piece, such as at 48.

The coping foot 1 has a longitudinal trough 8 medially formed into the rear section of the coping foot, said trough extending from said distal end 21 toward said proximal end 20, generally terminating at a plane perpendicular to the rear edge of the domed bearing surface 5. The longitudinal trough 8 creates right and left ridges 7a and 7b from each of the lateral portions of said coping foot 1. The trough area 8 is fitted with a mounting slot 12 or a series of holes located along the center line of the coping foot 1 for mounting the foot to the saw body mounting 43 by means of a mounting bolt 9. A washer 13, having a rounded bottom surface corresponding to the cross-sectional shape of the trough 8, is provided for solid engagement between mounting bolt 9 and coping foot 1. The junction of the longitudinal trough 8 and the distal base or edge of the domed bearing surface 5 may form a transverse slot 10, whose orientation is perpendicular to and which is disposed between the mounting slot 12 and saw blade port 6.

In a preferred embodiment of the invention, the entire device is stamped from a single piece of rigid metal, such as steel or aluminum. However, as can be appreciated by one skilled in the art, the foot plate could be made from other materials, as well, such as plastics or composites, and may be cast, molded or otherwise formed in addition to being stamped. The primary bearing surface 5 of the coping foot 1 is composed of a curved or domed surface, which slopes away from the blade 29 relative to the tip of the blade. Saw blade port 6 provides a view of the reciprocating wheel mechanism (not shown) generally in the vicinity of 42, the clearance of the wheel from the inner cup, that is the inside of the domed surface 5 of the coping foot 1, allows for installation of blades 29 insertion and provides wide clearance for the blade teeth 45 on either side of the port.

Flanges 25 and 26 of coping foot 1 are generally located in the same plane as the sloping sides of the domed bearing surface 5 and provide additional leverage and resting support when the jig saw is laid over at a steep angle. The ridges 7a and 7b are formed and contiguous to the bearing or lower surface 16 of coping foot 1 and carry and support the work demands placed upon it, meaning demands imposed by the nature of the stock material 48 which is being cut by the saw blade 29.

The longitudinal trough 8 of the rear mounting area, as it relates to the curved or domed bearing surface 5, is designed to rest in rounded mounting channel 43 formed on a jig saw body 40, and maintain orientation parallel to, and in line with, the cut angle or cut curve. The mounting area or trough 8 is provided with a parallel slot 12, round hole(s) or the like, through which a mounting bolt 9 (which is typically supplied with the conventional base) passes to attach and firmly fix the coping foot 1 to the saw mounting channel 43. However, it should be appreciated that the means for mounting the foot plate 1 to the body 40 of the saw could additionally encompass other mounting methods as well, such as clamping, magnetics, press-fit and the like. The mounting slot 12 provides the flexibility to allow the coping foot 1 to be adaptably fastened to multiple saws configurations which may be expected as between differing saw manufacturers.

The domed bearing surface 5 and longitudinal trough 8 are delineated and defined and separated by a slot 10 cut transversely near midway in the body of the invention. The junction of the longitudinal trough 8 and the rear edge of the domed bearing surface 5 may form a transverse slot 10, whose orientation is perpendicular to and between the mounting slot 12 and saw blade port 6. The orientation of said transverse slot 10 permits delineation of longitudinal trough 8 from domed bearing surface 5 and allows debris from cut material 48 to exit from area immediate the saw blade 29 during cutting.

It is expected that craftsmen will use the coping foot 1 with the saw grasped and held upside down or with the blade 29 pointed upward, much the way as depicted in FIG. 4. In this manner the craftsman can observe and guide the blade along a predetermined cut line 50, such as a scribed mark or mitered cut, from above as saw blade 29 cuts through the finished side of the work piece 48.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

I claim:

1. A foot plate for a reciprocating saw having a saw blade comprising:

a formed plate having a top surface and a bottom surface opposite said top surface; a proximal end and a distal end opposite said proximal end; left and right flanged bearing surfaces, opposite one another; and a domed bearing surface having a saw blade port forming a cutting area for facilitating compound cuts being made into a material in a single pass of the saw by maintaining bearing with said material in proximity to said cutting area.

2. The foot plate according to claim 1 wherein the shape of said domed bearing surface allows a reciprocating saw blade, extending through said saw blade port, to be beveled, pitched and angled in a relatively unrestricted manner during use without requiring physical adjustment of the foot plate with respect to said reciprocating saw.

3. The foot plate according to claim 1 wherein said the shape of said domed bearing surface allows said saw blade to be beveled more than 45° while maintaining bearing contact with said material in proximity to the cutting area.

4. The foot plate according to claim 1 wherein the shape of said bearing surface allows bearing contact of said foot plate in proximity to the cutting area in any of 360° while producing triple compound angle cuts in said material.

5. A foot plate attachable to the base of a reciprocating saw for effecting triple compound cuts in a material, comprising:

a formed plate having a top surface and a bottom surface opposite said top surface; a proximal end and a distal end opposite said proximal end; left and right flanged bearing surfaces, opposite one another; a domed bearing surface disposed toward said proximal end of said formed plate, said domed bearing surface having a saw blade port extending intermediate the apex of said domed surface and said proximal end forming a cutting area through which a saw blade may protrude; and a longitudinal trough formed into a portion of said formed plate, extending from a line perpendicular to the rear of said domed bearing surface to said distal end of said formed plate, and having a mounting means for mounting said formed plate to said reciprocating saw.

6. The foot plate according to claim 5 wherein the shape of said domed bearing surface allows a reciprocating saw blade, extending through said saw blade port, to be beveled, pitched and angled in a relatively unrestricted manner during use without requiring physical adjustment of the foot plate with respect to said reciprocating saw.

7. The foot plate according to claim 5 wherein said the shape of said domed bearing surface allows said saw blade to be beveled more than 45° while maintaining bearing contact with said material in proximity to the cutting area.

8. The foot plate according to claim 5 wherein the shape of said bearing surface allows bearing contact of said plate in proximity to the cutting area in any of 360° while producing triple compound angle cuts in said material.

9. The foot plate according to claim 1 or 5 wherein said formed plate is symmetrical about a centerline running from said proximal to said distal ends.

10. The foot plate according to claim 1 or 5 wherein said proximal, end of said foot plate is rounded.

11. The foot plate according to claim 1 or 5 wherein said formed plate is fabricated from rigid material.

12. The foot plate according to claim 1 or 5 wherein said formed plate is metallic.

13. The foot plate according to claim 12 wherein said formed plate is stamped.

14. The foot plate according to claim 12 wherein said formed plate is molded.

15. The foot plate according to claim 1 or 5 wherein said formed plate is nonmetallic.

16. The foot plate according to claim 15 wherein said formed plate is molded.

17. A method for using a foot plate having a domed bearing surface with a jig saw to cut triple compound angles into a material, comprising the steps of:

attaching said foot plate to said jig saw with said domed bearing surface facing away from said jig saw and facially confronting said material;

securing said foot plate to the jig saw so that a saw blade of said saw extends through a port in said domed bearing surface to form a cutting area;

cutting said material with said saw blade by following a predetermined cutting path while applying contacting pressure onto material via said domed bearing surface in proximity to the cutting area; and maneuvering the cut angle and line of said saw blade during cutting while simultaneously adjusting the bevel and pitch of the cut line to form a triple compound angle.

* * * * *